Feb. 22, 1966  J. R. TUSSON  3,235,977
SLIDE DEVICE FOR STUDY OF SEQUENTIAL DATA
Filed March 14, 1963  3 Sheets-Sheet 1

JOHN R. TUSSON
INVENTOR

BY  Francis B Francois

ATTORNEY

Feb. 22, 1966  J. R. TUSSON  3,235,977
SLIDE DEVICE FOR STUDY OF SEQUENTIAL DATA
Filed March 14, 1963  3 Sheets-Sheet 2
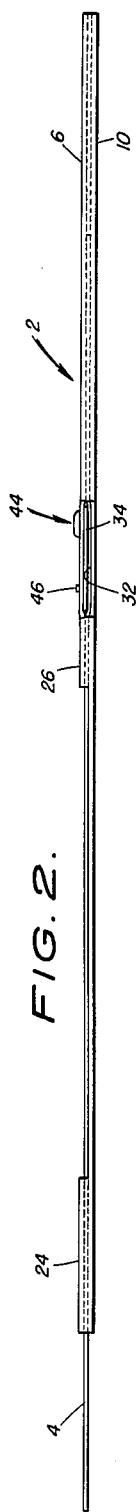
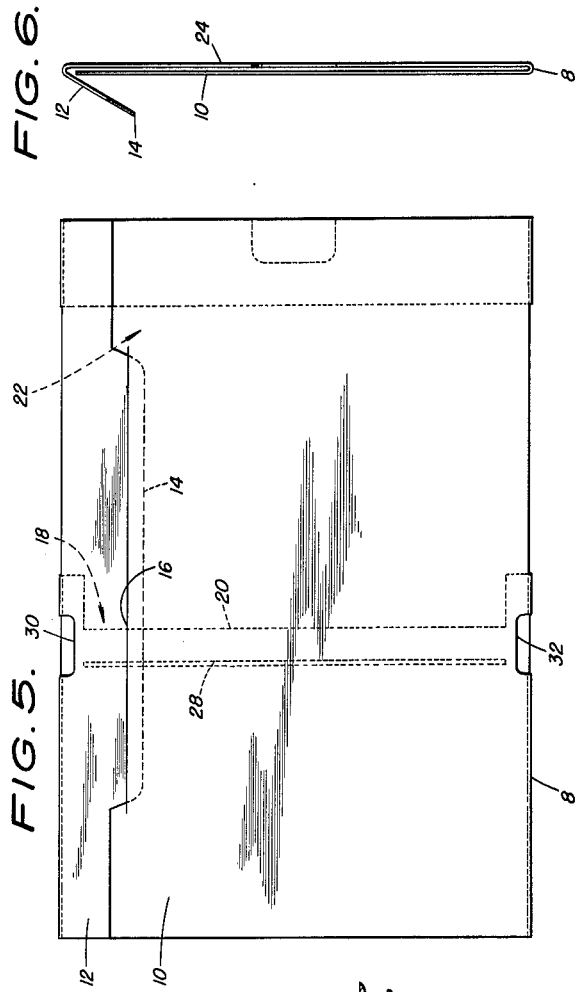
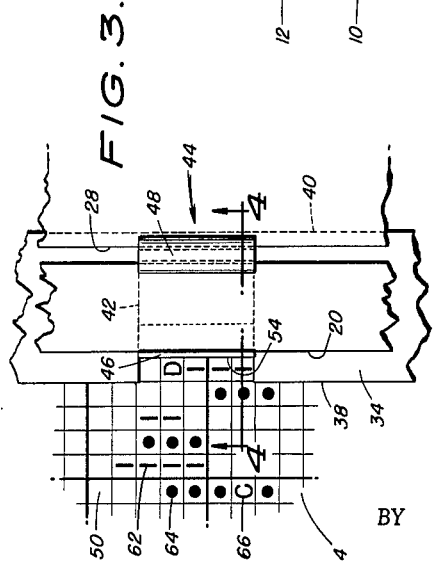
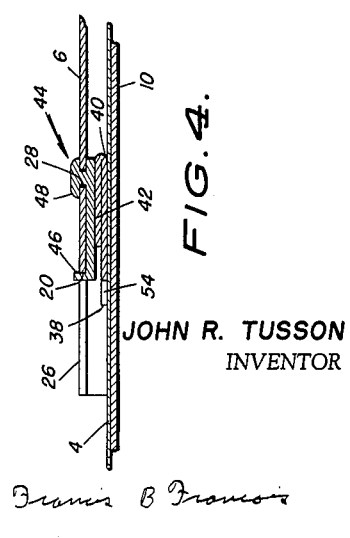
JOHN R. TUSSON
INVENTOR
BY  *Francis B Francis*
ATTORNEY Feb. 22, 1966 J. R. TUSSON 3,235,977
SLIDE DEVICE FOR STUDY OF SEQUENTIAL DATA
Filed March 14, 1963 3 Sheets-Sheet 3

JOHN R. TUSSON
INVENTOR

BY Francis B Francois

ATTORNEY

United States Patent Office 3,235,977
Patented Feb. 22, 1966

3,235,977
SLIDE DEVICE FOR STUDY OF
SEQUENTIAL DATA
John R. Tusson, Belle Chasse, La.
(708 Carondelet Bldg., New Orleans 12, La.)
Filed Mar. 14, 1963, Ser. No. 265,096
5 Claims. (Cl. 35—75)

This application is a continuation-in-part of U.S. patent application Serial Number 158,398, filed December 11, 1961, and entitled "Study Machine."

This invention relates generally to study machines, and more particularly to an improved study machine for use in analyzing sequentially arranged data, the relationships therebetween, and the effects thereon of other events, conditions and information.

It frequently is desirable to analyze sequentially arranged data, both to derive information therefrom and to acquire an ability to predict the effect on the information contained in the data of historical events, equipment utilized, and the like. For example, it is known that by analyzing the price history of securities and the effect thereon of certain historical events the ability can be acquired to predict with a fair degree of accuracy what the effect of a certain historic event will be on security prices. The study machine of the present invention is constructed to present sequentially arranged data in an orderly manner, and to readily indicate the relationships between such data and historical events, structural relationships, operating conditions and the like.

In analyzing data for the purpose of acquiring a prediction ability it usually is desirable that it be disclosed in sequence, and that data occurring after that being analyzed be hidden from view until desired. The study machine of the present invention is especially adapted to insure sequential disclosure of data without danger of preliminary viewing, and is easily manipulated.

For widest distribution it is desirable that a study machine capable of disclosing sequentially arranged data be economical to fabricate, whereby retail cost will be kept at a minimum. The novel study machine of the present invention may be easily and economically constructed, and is fully capable of functioning to properly disclose sequentially arranged data. Further, the study machine of the present invention may be utilized to present various types of information, and hence is adaptable to many needs.

It is an object of this invention to provide a study machine for presenting sequentially arranged data, and which may be easily and economically fabricated.

A further object of the present invention is to provide a study machine that may be easily manipulated, and which is constructed to keep data secret until disclosure thereof is desired.

Another object of the subject invention is to provide a study machine capable of use with various kinds of sequentially arranged information.

It is also an object of this invention to provide a study machine capable of sequential analysis of data as it relates to a three-dimensional coordinate system.

Still another object of this invention is to provide a study machine capable of presenting programmed three-dimensional data.

Other objects and many of the attendant advantages of the invention will be readily appreciated as the same becomes better understood by reference to the following detailed description when considered in connection with the accompanying drawings, wherein:

FIG. 2 is a side elevation of the study machine of FIG. 1;

FIG. 3 is an enlarged plan view of the central portion of the slide bar of the study machine;

FIG. 4 is a sectional view taken along the line 4—4 in FIG. 3, and shows the manner in which the slide bar is mounted;

FIG. 5 is a plan view of the bottom of the study machine, showing the construction thereof;

FIG. 6 is an end view of the study machine, showing the manner in which it is constructed;

Figure 1:
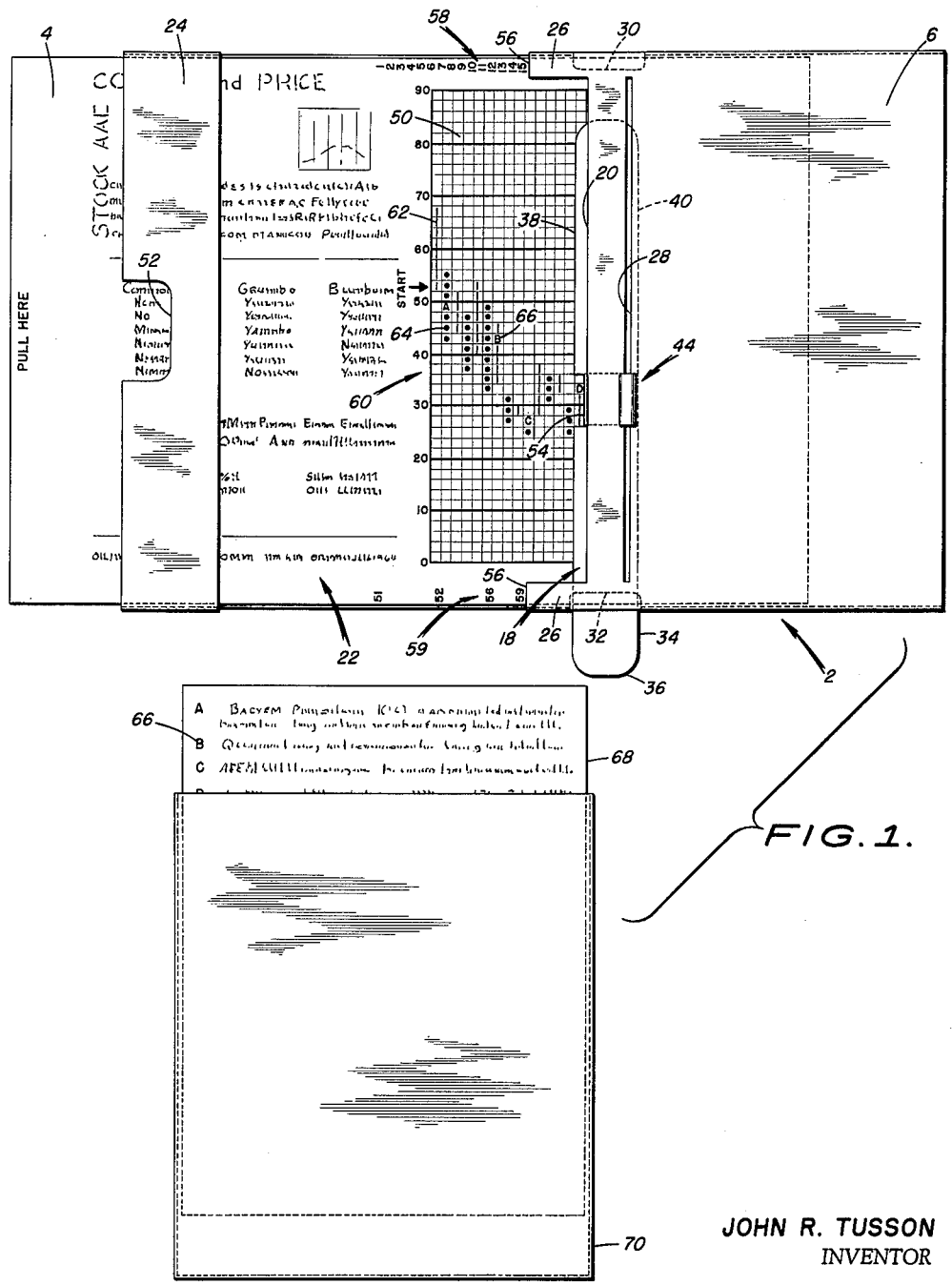
FIG. 1 is a plan view of the study machine of the invention, with a data chart being shown therein and an information chart shown adjacent thereto.

In the previous, hereinabove identified patent application a study machine was described which is especially useful for analyzing time correlated data, such as the price history of securities and the like. According to the invention disclosed in that application the price history of a security is charted in a plurality of parallel columns, one column containing upward price movements and an adjacent column containing downward price movements. Each column contains symbols which indicate whether the price movement for that column is up or down, and characters are interspersed among these symbols and refer the user to an information chart. The information chart contains a plurality of items of information about the security, each item being identified by one of the characters interspersed among the symbols.

The column-bearing chart is utilized in the prior application with a study machine, which machine is constructed to disclose, one column at a time, the symbols and characters on the chart. By chronologically disclosing the information on the column-bearing chart, and referring to the information chart whenever characters are disclosed, it is possible to analyze the effect of historical events on security price movements. While the invention of the prior application is described primarily with reference to security price analysis, it is obviously adaptable to the analysis of various other types of information.

The essential concept contained in the prior application is that of arranging sequential data in a plurality of parallel columns, whereby it may be progressively analyzed by moving down said columns. By inserting at specific points in said columns references to historical events, operating conditions, structural relationships, and numerous other types of information, it is possible to analyze the effects on the columnar data of such information. Thus, a ready means of analysis of sequential data was provided by the invention of said prior application.

This invention is directed primarily to improvements in the invention disclosed in the prior application, and especially to an improved study machine for use in sequentially disclosing columnar data. The study machine of the present invention is constructed from commonly available, relatively inexpensive materials, such as plastic or heavy cardboard. It comprises a specially constructed envelope having mounted thereon in a unique manner a movable slide, the slide and the envelope being arranged to sequentially disclose columnar information contained on a chart.

In addition to an improved teaching machine, the present invention provides an expansion of the teaching concept of the prior application to various types of data, such as three-dimensional analysis, comparative study of simultaneous happenings, and other subjects. The present invention thus contemplates a teaching tool that is adaptable for many teaching and analysis purposes.

Referring now to the drawings, a study machine is indicated at 2 having a column-bearing data chart 4 mounted thereon. The teaching machine 2 is constructed of plastic, cardboard, or a like sheet material, and consists of a front panel 6 connected along one edge 8 thereof to a back panel 10 (FIGS. 5 and 6); the panels 6 and 10 may be formed as shown in FIG. 6 by folding a single sheet of material along the edge 8, or they may consist of two separate panels interconnected along said edge by a suitable bridging member. The panels 6 and 10 are also connected along the edges thereof opposite the edge 8 whereby to define an open ended envelope, said edges being connected in the invention by a flap 12 formed by folding back an extending portion of the front panel 6.

The flap 12 has a tapered tab 14 positioned medially thereof, which tab is receivable within a slit 16 in the back panel 10 to thereby secure the two panels together (FIG. 5). The interconnected front and back panels 6 and 10 define an open ended envelope within which the data chart 4 is slidably received.

The front panel 6 has a first, relatively narrow rectangular cutout portion 18 therein which does not extend the full width of said panel, and which defines a straight edge 20 disposed perpendicularly to the panel edge 8. The panel 6 also has a second, relatively large rectangular cutout portion 22 therein which extends the full width of said panel, and which defines a hold down strip 24 across one end thereof. The two cutout portions 18 and 22 together define a pair of rectangular tabs 26, one at each of the opposite edges of the panel.

The panel 6 has a slot 28 therein spaced from and extending parallel to the straight edge 20, said slot having a length corresponding to that of said straight edge. The opposite edges of the back panel 10 have aligned cutout notches 30 and 32 therein, which notches extend into the material joining said panel 10 to the panel 6 and the flap 12; the openings defined by the notches 30 and 32 have a width greater than the distance measured between the straight edge 20 and the remote wall of the slot 28.

Disposed between the panels 6 and 10 and in alignment with the notch openings 30 and 32 is a rectangular slide bar 34, said bar having rounded corners 36 thereon whereby to facilitate its passage through said notch openings. The slide bar is constructed of cardboard or a like material, and has a width corresponding to that of said notch openings, whereby the forward edge 38 thereof extends beyond the straight edge 20 and the rear edge 40 thereof extends beyond the slot 28. Medially thereof the slide bar 34 has a rectangular tab 42 thereon, said tab being folded back onto the slide bar and having a width about two-thirds thereof (FIGS. 3 and 4). Secured to the top surface of the folded tab 42, as by cement, is a handle 44 constructed of plastic or some other suitable material.

The handle 44 has an upwardly projecting flange 46 along its front edge and a T-shaped in cross-section grasping portion 48 projecting upwardly therefrom through the slot 28. The vertical bar of the grasping portion 48 has a width slightly less than the width of said slot, and extends the full length of the handle. The cross bar of the grasping portion extends over the panel 6 on both sides of said slot. The handle is thus constrained by the flange 46 and the grasping portion 48 to lie parallel to the straight edge 20, and thus the slide bar 34 is also constrained to lie parallel to said edge. The slide bar may be translated parallel to the straight edge 20 by merely moving the handle 44, the ends of said slide bar passing through the notch openings 30 and 32 as the handle is moved theretoward. It is to be understood that the thickness of the elements shown in FIG. 4 are exaggerated for purposes of clarity, and that in an actual study machine the spacing between the panels 6 and 10 would be less than is shown in said figure. The handle 44 is mounted in position by flexing the panel 6 adjacent the slot 28.

The data chart 4 has thereon a plurality of parallel columns 50 sealed along their lengths (as shown in FIG. 1) and disposed to extend perpendicularly to the edge 8, and hence disposed to lie parallel with the straight edge 20. The combined widths of the columns 50 is less than the breadth of the solid portion of the panel 6 behind the straight edge 20, whereby when the chart 4 lies within the perimeter of said panel the columns will be completely hidden from view. When the chart 4 is grasped and pulled to the left in FIG. 1, such grasping being facilitated by a cutout 52 in the hold down strip 24, the columns 50 will thus be exposed one at a time at the edge 38 of the slide bar 34.

Each of the parallel columns 50 contains data arranged in a sequential array to present a portion of a data record, it being desirable to disclose said data in sequence. To facilitate such disclosure the edge 38 of the slide bar 34 has a rectangular notch 54 therein, said notch 54 having a width equal to one column and a length corresponding to several items of data, say five. Thus, by moving the handle 44 the data in a column will be exposed in sequence in the notch 54.

The rectangular tabs 26 function to hold the data chart 4 in position as it is pulled to the left in FIG. 1, and the front edges 56 thereof are also utilized for another purpose. The chart 4 has printed thereon along its upper edge a linear scale 58, which scale contains sequentially arranged indicia spaced apart a distance equal to the width of one of the columns 50. The scale 58 is positioned so that the indicia thereof are disclosed at the edge 56 of the upper tab as the chart is pulled to the left to indicate the number of the column exposed within the notch 54. Similarly, the lower edge of the chart 4 has a scale 59 thereon which indicates the years to which the columns relate; since the number of columns may vary per year, the numerals in the scale 59 may not be equidistant. The scale 59 is disclosed under the lower tab edge as the chart is pulled to the left.

The type of information related by the data in the columns 50 will vary, depending upon the subject matter being analyzed. However, the teaching principle of the invention is applied alike to various types of data, and hence will be described generally.

The teaching principle of the invention comprises the placing of sequential data in a plurality or parallel columns, the data then being disclosed by the slide bar 34. Thus, each column contains a portion of the data record of the subject matter being studied, and the successive columns on a chart when taken together present an overall data record. For example, assume that the data being studied consists of the price movements of a stock and the relation of news events thereto. Applying this example to FIG. 1, the columns 50 would have a vertical price scale 60 related thereto, and upward price movements would be contained in one column and downward price movements in an adjacent column; in FIG. 1 these movements are represented by vertical dash and dot symbols 62 and 64, respectively. Thus, by moving the slide 34 the price movements of the stock may be followed.

Interspersed among the symbols 62 and 64 in FIG. 1 are a plurality of alphabet characters 66, each of which identifies a particular news item contained on an information chart 68. The chart 68 is disposed within an opaque envelope 70, and is withdrawn therefrom to expose a news item only when that item's identifying character is exposed by the slide 34. Thus, by operating the slide bar 34 the price history of the security may be studied in relation to the effect thereon of news events, whereby a prediction ability may be acquired over a period of time.

The portion of the chart 4 initially exposed within the opening 22 has printed thereon basic, preliminary information concerning the data being studied. If desired, this data could be placed elsewhere and the size of the opening 22 reduced. Similarly, the opening 22 may be expanded to contain more information, as may the envelope 6.

In another example of how the study machine might be utilized the scale 60 could relate to sales volume, the symbols 62 and 64 to upward and downward sales trends, and the characters 66 to the type of advertising employed or the like.

The study machine of the invention may also be utilized for three dimensional analysis. One or more machines are employed. By way of example, when two machines are employed, the vertical scale on both data charts would be numbered to correspond to the Z axis and the columns on the two data charts would be respectively numbered to correspond to the X and Y axes. The symbols in the columns would then indicate positions in space, and the characters in the columns would relate to an information chart listing ambient conditions or the like at the points represented by the respective coordinates. By so utilizing the study machine geological data and the like may be systematically and sequentially analyzed to acquire an ability to predict what geological conditions will exist at a particular point in the earth.

Figure 7:
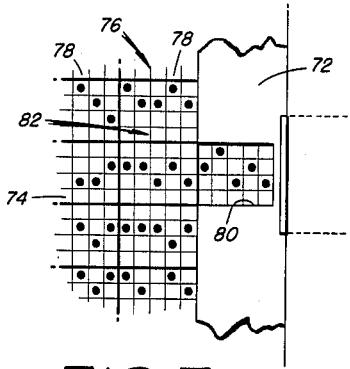
FIG. 7 is a plan view of a modified slide bar.

The study machine of the invention may also be utilized to analyze several items of sequential data occurring nearly simultaneously in time. In such an instance each column 50 may be divided into subcolumns, one for each item of sequential data. A modification of the invention incorporating this feature is shown in FIG. 7, wherein is illustrated a slide 72 and a data chart 74, the latter having columns 76 thereon each of which is divided into a plurality of subcolumns 78. The slide 72 has a notch 80 therein having a width corresponding to the width of one of the columns 76.

The modification of FIG. 7 may be utilized for many types of data, and even for many games. For example, the device could be utilized to simulate a horse race, in which instance each subcolumn 78 would represent a particular horse. The columns 76 would be divided into vertical sections 82 each having a length corresponding to the height of the notch 80; by then moving the slide 72 from section to section the respective positions of the horses, represented by dots in the subcolumns, could be followed around the racecourse (the racecourse being represented by the length of a column 76). It is to be understood that the study machine of FIG. 1 might also be utilized with games and the like, especially those where skill in predicting events is a factor.

Figure 8:
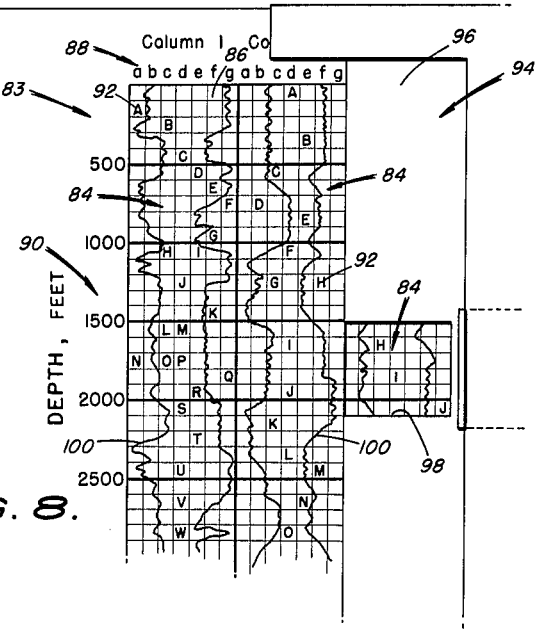
FIG. 8 is a plan view of another modified slide bar and a three-dimensional geological chart for use therewith.

By using a modification of the columns and subcolumns of FIG. 7 it is possible to conduct a three-dimensional geological analysis with but one study machine. Such an arrangement is shown in FIG. 8, wherein is illustrated a chart 83 having a plurality of columns 84 thereon, each divided into a plurality of subcolumns 86; each of the subcolumns 86 is identified at its top by an alphabet letter 88. Each column of the chart 82 represents a specific area on the surface of the earth, and each subcolumn represents a subdivision of that area. The vertical scale 90 along the left side of the chart indicates depth, measured from the top of the column downwardly. As in the chart of FIG. 1, a plurality of alphabet characters 92 are interspersed at various points within the subcolumns of each column and refer to items of information contained on an information sheet (not shown), one such sheet being supplied for each column 84. The items of information contain such information as core analysis, cost of drilling to the depth indicated, supplemental charts, diagrams and maps, and statements that oil, gas, water, hard rock, and the like will be found at the point indicated by the character.

The chart 83 is mounted in a study machine 94 having a slide 96 thereon, said slide having a cutout portion 98 which extends the full width of one of the columns 84. Each of the columns 84 has superimposed thereon a Schlumberger log diagram 100 which furnishes information concerning the properties of the rock and the fluid in the rock found below the surface of the earth. Because the electrical tests used to establish a Schlumberger diagram normally cover an area larger than the spot where the drill is sunk into the ground, the log diagrams are superimposed over the entire area covered by the respective column. Each column thus presents a data record of the ground area being studied, and successive columns relating to successive ground areas when taken together can present an overall data record for a large area of ground.

The study machine arrangement of FIG. 8 may be utilized to analyze the geological structure of the areas of the earth covered by the columns to determine what structure lies below the earth, whether or not oil or gas can be expected to be found, and like information. Thus, by utilizing the apparatus of FIG. 8 it is possible to acquire an ability to predict such geological information.

In use, the device of FIG. 8 is employed as follows. The analyzer will move the chart 83 to the left to expose a column within the opening 98. He then will choose one of the sub-divided areas in that column, represented by a particular subcolumn, and will move the slide downwardly of the column. As the slide moves downwardly the Schlumberger diagram will be disclosed, and the information related thereby will thus be acquired by the analyzer. When characters are disclosed within the particular subcolumn which the analyzer has chosen, he will pause and refer to the information sheet for that subcolumn. He thus continues along the chosen subcolumn until he decides to try another area, represented by another subcolumn.

When the analyzer decides to try another subcolumn, he moves the slide back to the top of the column. He then proceeds down the new column in the same manner as before. He now has available to him the same Schlumberger information as before, and additionally the information disclosed on the information sheet of the previous subcolumns which he has analyzed. When a character is uncovered in the new subcolumn he refers to the information sheet for that subcolumn to determine what information is available at that point. In this way the analyzer can develop geological information for an entire oil and gas field, while at the same time striking oil and gas at various points in the field.

Figure 9:
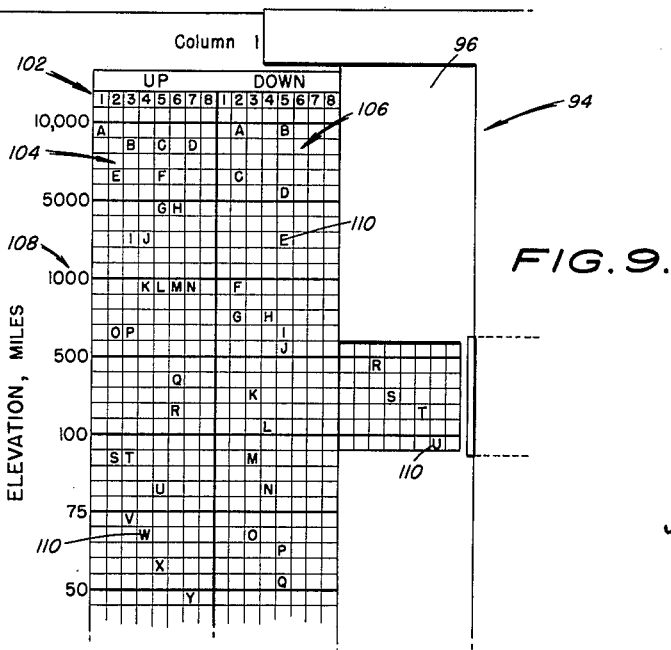
FIG. 9 is a plan view of the slide bar of FIG. 8, with a three-dimensional space flight chart therein.

The three dimensional analysis concept utilizing one study machine is also adaptable for analyzing outer space flight. Referring to FIG. 9, a chart 102 is illustrated having a plurality of columns 104 and 106 thereon, said columns being arranged in pairs and being labeled "up" and "down" respectively. Each of the columns is subdivided into a plurality of subcolumns, each of which is numbered. The vertical scale 108 on the left represents elevation in miles, starting from the bottom of the columns. The chart 102 is positioned in a study machine 104 identical to the study machine of FIG. 8.

Each of the subcolumns has disposed therein a plurality of characters 110, each of which refers to items on the information sheet for that subcolumn. Said items contain such information as dangers encountered, malfunctions in equipment, encounters with meteorites, and the like. The columns may, if desired, have log diagrams similar to the Schlumberger diagrams of FIG. 8 superimposed thereon, which diagrams could relate to the existence and position of radiation belts and the like.

In use, the chart 102 is pulled to the left to expose an upper column 104, and the slide 96 is moved to the bottom of said column. The analyzer then chooses one of the subcolumns for his ascent, each of which indicates a particular course. He then moves the slide 96 upwardly, disclosing the characters in the chosen subcolumn, which characters refer him to information contained on the information sheet for that subcolumn. At any time he may change course by changing subcolumns; he then continues up the newly chosen subcolumn, and has available to him all information disclosed in that subcolumn as well as that which was disclosed to him previously in the other subcolumns he has utilized. When the analyzer decides to return to earth, he pulls the chart to the left to expose the "down" column adjacent to the "up" column which he was previously utilizing. He then chooses a course represented by a subcolumn, and moves downwardly therein in a manner similar to that just described.

The study machine of the invention may also be used to relay various other types of information. For example, the decisions made and the experiences of leaders of the past may be analyzed thereby. In this instance the chart would again contain symbols, which here would relate to specific information relating to an event in the life of the person being studied. Numerous other applications for the study machine and teaching concept of the invention will readily present themselves to those familiar with the invention.

In the embodiments of FIGS. 7 and 8 it may be desirable to have the information contained in each column remain exposed as the slide bar is moved downwardly, whereby the analyzer has available all the information up to a given point. This may be done by either greatly increasing the height of the cutout, or notch, in the slide, or by having said notch defined by material only on the bottom and side thereof, whereby the slide assumes a generally L-shape. With either construction information in a column will remain exposed as the slide is moved downwardly of said column.

Obviously, many modifications and variations of the present invention are possible in the light of the above teachings. It is therefore to be understood that within the scope of the appended claims the invention may be practiced otherwise than as specifically described.

What is claimed is:

1. A study machine, including: an envelope open at least at one end thereof, and comprising a front panel and a back panel connected along their lateral edges; a chart slidably received within said envelope and movable through said open end, said chart having thereon a plurality of parallel, substantially identical in width columns extending perpendicular to said lateral edges and scaled along the length thereof, each of said columns containing data relating to the subject matter to be studied, the data in each column being arranged in sequential array relative to the scaled length of said column to present a portion of the data record of said subject matter and the data array in successive columns presenting successive portions of the data record of said subject matter, whereby the columns of data on said chart when taken together present an overall data record of said subject matter, certain of said columns also containing characters which identify items of information relative to said subject matter and pertinent to the data immediately adjacent said characters, said front panel having an opening therein of a length at least equal to the length of said columns and of a width at least as great as the width of one of said columns, said opening defining a straight edge extending perpendicular to said lateral edges and which faces forwardly toward said open end, the portion of said front panel rearwardly of said panel straight edge having an area at least as great as the total area occupied by said columns on said chart, said chart being initially received within said envelope with said columns concealed behind said front panel portion and during operation of said machine being translated toward said open end one column at a time; an elongated slide disposed between said front panel and said chart and arranged for translational movement parallel to said columns, the forward side of said slide projecting into said opening for a distance at least equal to the width of one of said columns and having a straight edge thereon which extends parallel with said panel straight edge, the forward side of said slide having a notch in its straight edge of a width at least equal to the width of one of said columns whereby the data and characters in a column lying beneath said slide will be progressively disclosed in sequence within said notch when said slide is translated along the length of said column, said notch being of such length that at each position thereof a predetermined amount of sequentially arranged data in a column can be exposed therein; a handle attached to said slide, said front panel having a slot therein spaced from and extending parallel to said panel straight edge, said slide extending rearwardly beyond said slot, and said handle projecting through said slot and having flange and groove means thereon engaging said front panel to constrain said slide to translational movement only in a direction parallel to said panal straight edge.

2. A study machine as recited in claim 1, wherein each of said columns is divided into a plurality of subcolumns.

3. A study machine as recited in claim 1, including additionally column indicating indicia means on said chart, and a second straight edge on said panel disposed to cooperate with said indicia for indicating columns exposed within said slide notch.

4. A study machine as recited in claim 1, wherein said slide includes a tab extending from the rear edge thereof and folded to lie between said slide and said front panel, said handle being secured to said tab.

5. A study machine as recited in claim 1, including additionally a second chart having items of information thereon each identified by one of said characters.

References Cited by the Examiner

UNITED STATES PATENTS

| 1,974,901 | 9/1934 | Stadler | 35—75 X |
| 2,046,239 | 6/1936 | Bardrof | 235—89 |
| 2,498,854 | 2/1950 | Hazel | 35—9 X |
| 2,537,508 | 1/1951 | Brokaw et al. | 129—16 |
| 2,699,894 | 1/1955 | Hirsch | 235—61 |

FOREIGN PATENTS 236,847  7/1925  Great Britain.

EUGENE CAPOZIO, *Primary Examiner.*

JEROME SCHNALL, *Examiner.*